(12) United States Patent
Murahashi et al.

(10) Patent No.: US 7,325,094 B2
(45) Date of Patent: Jan. 29, 2008

(54) RECORDING/REPRODUCING APPARATUS, RECORDING/MANAGING METHOD, RECORDING MEDIUM AND PROGRAM

(75) Inventors: Hideki Murahashi, Tokyo (JP); Hidetoshi Ichioka, Tokyo (JP); Kairi Sai, Tokyo (JP); Masaki Ishida, Kanagawa (JP)

(73) Assignee: Sony Corporation (JP)

( * ) Notice: Subject to any disclaimer, the term of this patent is extended or adjusted under 35 U.S.C. 154(b) by 406 days.

(21) Appl. No.: 10/493,190

(22) PCT Filed: Aug. 20, 2003

(86) PCT No.: PCT/JP03/10524

§ 371 (c)(1), (2), (4) Date: Dec. 9, 2004

(87) PCT Pub. No.: WO2004/019212

PCT Pub. Date: Mar. 4, 2004

(65) Prior Publication Data
US 2005/0086258 A1    Apr. 21, 2005

(30) Foreign Application Priority Data
Aug. 23, 2002    (JP)    ............................. 2002-243192

(51) Int. Cl.
*G06F 12/00* (2006.01)
(52) U.S. Cl. .................................... 711/112; 707/104.1
(58) Field of Classification Search ................. 711/112
See application file for complete search history.

(56) References Cited

U.S. PATENT DOCUMENTS 6,389,222 B1 * 5/2002 Ando et al. .................... 386/95
7,062,158 B1 * 6/2006 Ayaki ........................... 386/125
2001/0052038 A1 * 12/2001 Fallon et al. .................. 710/68
2002/0071652 A1 * 6/2002 Ohnishi ......................... 386/46
2003/0023987 A1 * 1/2003 Hiramoto et al. ............ 725/141

FOREIGN PATENT DOCUMENTS

| EP | 1 143 720 A1 | 10/2001 |
| JP | 9-070020 | 3/1997 |
| JP | 11-18039 A1 | 1/1999 |
| JP | 2000-21136 A1 | 1/2000 |
| JP | 2001-101797 | 4/2001 |
| JP | 2002-93119 A1 | 3/2002 |

* cited by examiner

*Primary Examiner*—Brian R. Peugh
*Assistant Examiner*—Hashem Farrokh
(74) *Attorney, Agent, or Firm*—Lerner, David, Littenberg, Krumholz & Mentlik, LLP

(57) ABSTRACT

The present invention provides a recording/reproducing apparatus capable of realizing proper recorded-content management on a large-capacity storage device. The content data recorded on the recording medium is managed with the content age computed by a lapse time from its recording date-and-time and a genre, and automatically deleted with priority of higher content age. Meanwhile, the user is allowed to instruct delete-prohibition management on a content not desired for automatic deletion. The content data placed under delete-prohibition management is excluded from a subject of automatic deletion. Meanwhile, concerning the delete-prohibition management, an upper limit value is provided. By disabling to unnecessarily placing a great deal of content data under delete-prohibition management, secured is a recording domain during automatic picture-recording or so.

19 Claims, 8 Drawing Sheets

43

EPG DATA

| CONTENT ID | TITLE | GENRE | CH | TIME (AIRING DATE/TIME) | PERFORMER | .... |
|---|---|---|---|---|---|---|
| ID1 | | | | | | |
| ID2 | | | | | | |
| ID3 | | | | | | |
| ID4 | | | | | | |
| ID5 | | | | | | |
| : | | | | | | |

FIG. 5

| CONTENT ID | CONTENT STATUS (PICTURE-RECORDING SCHEDULE/PICTURE-RECORDED) | DELETE-PROHIBITION INFORMATION | CONTENT AGE | CAPACITY (DATA SIZE) | DATE/TIME |
|---|---|---|---|---|---|
| ID1 | | | | | |
| ID2 | | | | | |
| ID3 | | | | | |
| ID7 | | | | | |
| ID9 | | | | | |
| .. | | | | | |

56

RECORDING/REPRODUCING APPARATUS, RECORDING/MANAGING METHOD, RECORDING MEDIUM AND PROGRAM

TECHNICAL FIELD

The present invention relates to a recording/reproducing apparatus for recording/reproducing a multimedia content of data in various kinds, such as video, audio and texts, and a recording/managing method, recording medium and program for a recorded multimedia content.

BACKGROUND ART

There is a spread of AV appliances in various kinds for recording/reproducing video data, audio data, etc., e.g. as video tape recorders and disk recorders/players having, as recording mediums, magnetic tapes and optical disks, magnetooptical disks, memory cards and the like. Recently, there have been developed appliances for recording/reproducing a diversity of contents (multimedia contents) of video, music, data files, etc. by using large-capacity recording mediums, e.g. HDDs (hard disk drives).

For example, a recording/reproducing section having an HDD as a recording medium is provided on a digital broadcast tuner, being realized as a recording/reproducing apparatus capable of recording broadcast programs.

In the meanwhile, because the conventional video tape recorder or the like is small in recordable capacity, the user is allowed to grasp a video content, etc. recorded on the video tape or the like. If unnecessary, it is used by overwrite-recording. Thus, there is no need to automatically manage the recorded contents, e.g. automatically erase unwanted contents.

Meanwhile, because there is no electronic additional information for the apparatus to grasp a content, automatic management of contents is impossible to implement.

However, in the digital audio/video recorder using a recent large-capacity random-accessible hard disk, storage capacity is great. This makes difficult for the user to grasp all the recorded contents. Meanwhile, there becomes troublesome in such management that the user deletes unnecessary contents by himself/herself. Also, on even a large-capacity recording medium, if unnecessary contents are left over a long time, it some time becomes full in capacity, resulting in a situation not for recording furthermore.

For this reason, it is desired to automatically implement content management on the apparatus side in order to improve the user's operationality.

Meanwhile, in the usual scheduling for picture-recording, when the user is making a scheduling operation, in the case it is determined that the storage device capacity required for picture-recording cannot be secured, the contents can be erased in an interactive form with the user.

However, the recording/reproducing apparatus using an HDD has a function to automatically picture-record a broadcast program on the basis of user's taste or viewing history, or a program recommended from a broadcast station or service site. The user does not carry out operations in executing such automatic picture-recording. Namely, recording proceeds regardless of user's intention. In this case, even in case capacity is insufficient, it is impossible to delete unwanted contents by an interactive form with the user.

From this fact, content management with automatic erasure is desired in order to secure a recording domain of storage device at all times.

Herein, as a technique for automatically managing the contents recorded on the HDD for example, there is known for example an automatic deleting function of automatically deletion from old contents. Namely, content recording date-and-time is placed under management, to delete those as required in the order of older recording date-and-time.

In this case, however, because deletion is by reason that a certain content is old, there is a case improper for the user. For example, it is improper to delete, because of the reason of old, a content the user likes and enjoys reproduction repeatedly.

Meanwhile, as disclosed in JP-A-11-18039, there are those for automatically erasing a content by utilization of whether a content has been reproduced or not or of the information about the number of times of reproductions. However, there are cases considered not proper in the scheme of determining a subject of automatic deletion on the basis of a presence or absence of reproduction or the number of times thereof.

For example, news program, once viewed, can be deleted usually. However, in the case of music video, the more the number of times of reproductions are, the higher the user possibly views it again. Hence, it should not be a subject of deletion.

Meanwhile, as disclosed in JP-A-2000-21136, there is also a scheme that the user selects four levels of "Save Unconditional", "Auto Delete After Viewing", "Auto Delete Upon Passing Save Period" and "Auto Delete Unconditional" on each recorded content so that the system can manage contents as per user's designation. This reflects user's intention, preventing against improper deletion. However, the user is required to designate multi-stage management levels on each content, hence troublesome for the user. For example, the user is uncertain of in his/her decision as to which management level is to be taken for the content, and feels troublesomeness in designating the management levels in plural stages.

Meanwhile, if the user should designate "Save Unconditional" or "Auto Delete After Viewing" for the most of contents, there is a possibility to cause a situation that, when delete execution is needed, there is no contents for deletion.

Considering the current situation that storage capacity increase is in rapid advancement for the multimedia content recording/reproducing apparatus using an HDD or the like, it can be expected for the user to manage recorded contents. Importance is placed on content management of automatically deleting unnecessary contents. The above schemes have a possibility to delete not along with user's intention, or encounter a case a comparatively heavy operation burden is imposed on the user or necessary deletion is not to be executed. This is not necessarily considered as proper control of automatic deletion.

DISCLOSURE OF THE INVENTION

Therefore, it is an object of the present invention to prevent great operation burden on the user and further enable proper automatic deletion, as a multimedia content recording/reproducing apparatus or a record managing method therefor.

Accordingly, a recording/reproducing apparatus of the present invention comprises: recording/reproducing means capable of recording inputted content data to a recording medium and reproducing content data from the recording medium; content-status managing means for managing a content age as a value age-addition-processed on the content data recorded on the recording medium, depending upon a lapse time from a recording execution data-and-time and a genre of the content data; and automatic-deletion control means for making reference to the content age under management of the content-status managing means as to the content data recorded on the recording medium, and automatically deleting the content data with priority of higher content age from the recording medium.

Meanwhile, the automatic-deletion control means carries out deleting the content data with priority of higher content age, on the basis of a remaining recordable capacity of the recording medium and a capacity required for content data to be recorded to the recording medium.

Meanwhile, the content-status managing means is adapted to make a delete-prohibition management on the content data recorded on the recording medium, and the automatic-deletion control means carries out deleting the content data with priority of higher content age, excepting the content data placed under delete-prohibition management in the content-status managing means.

Meanwhile, the content-status managing means places under delete-prohibition management content data that an operation input instructing delete-prohibition has been done of among the content data recorded on the recording medium.

Meanwhile, when carrying out delete-prohibition management on the content data, provided is an upper limit value of a total amount of content data to be placed under delete-prohibition management.

Meanwhile, in a case determined that the total amount of content data to be placed under delete-prohibition management exceeds the upper limit value, notification is made of a fact delete-prohibition management is impossible.

Meanwhile, the upper limit value of a total amount of content data to be placed under delete-prohibition management is to be previously set or desirably set.

Meanwhile, further comprised of a display-data output means for outputting display data including a matter informing that content data scheduled for automatic deletion is singled out of the content data recorded on the recording medium on the basis of the content age under management of the content-status managing means, and automatic deletion is scheduled on the singled-out content data.

Meanwhile, the recording/reproducing means automatically records content data in a genre a user likes to the recording medium.

Meanwhile, the recording/reproducing means records content data of recommendations provided by service to the recording medium.

Meanwhile, the recording/reproducing means records content data selected from a list of information of the content data by a user's operation input to the recording medium.

Meanwhile, the recording/reproducing means records the content data in a compression form to the recording medium.

Meanwhile, a genre-based coefficient value upon making an age-addition process on the content age is to be previously set or set/changed.

Meanwhile, a record managing method of the invention comprises: a managing procedure of managing a content age as a value age-addition-processed on content data recorded on the recording medium, depending upon a lapse time from a recording execution data-and-time and a genre of the content data; and an automatic deleting procedure of making reference to the content age as to the content data recorded on the recording medium, and automatically deleting the content data with priority of higher in the content age from the recording medium.

Meanwhile, a recording medium of the invention recording a computer-readable program, the program being for a recording/reproducing apparatus and including: a managing step of managing a content age as a value age-addition-processed on content data recorded on the recording medium, depending upon a lapse time from a recording execution data-and-time and a genre of the content data; and an automatic deleting step of making reference to the content age as to the content data recorded on the recording medium, and automatically deleting the content data with priority of higher in the content age from the recording medium.

Meanwhile, a program of the invention for a computer for controlling a recording/reproducing apparatus to execute: a managing step of managing a content age as a value age-addition-processed on content data recorded on the recording medium, depending upon a lapse time from a recording execution data-and-time and a genre of the content data; and an automatic deleting step of making reference to the content age as to the content data recorded on the recording medium, and automatically deleting the content data with priority of higher content age from the recording medium.

Meanwhile, a recording/reproducing apparatus of the invention comprises: recording/reproducing means capable of recording inputted content data to a recording medium and reproducing content data from the recording medium; content-status managing means capable of placing under delete-prohibition management one or a plurality of ones of content data equal to or less than the upper limit value of among the content data recorded on the recording medium; and automatic-deletion control means for automatically deleting, concerning the content data recorded on the recording medium, the content data from the recording medium, excepting content data being placed under delete-prohibition management in the content-status managing means.

Meanwhile, the upper limit value is set as a capacity value in a predetermined percentage of a capacity of the recording medium, whereby a total capacity of one or a plurality of ones of content data to be placed under delete-prohibition management is equal to or less than the predetermined percentage of capacity value.

Meanwhile, the content-status managing means, in the case an operation input instructing delete-prohibition is made for certain content data of among the content data recorded on the recording medium, prohibits the relevant content data from being deleted thereby determining whether to exceed the upper limit value wherein, in a case determined not to exceed the upper limit value, the relevant content data is placed under delete-prohibition management.

Meanwhile, a recording managing method of the invention comprises: a managing procedure for placing under delete-prohibition management one or a plurality of ones of content data equal to or less than the upper limit valve of among the content data recorded on the recording medium; and automatic deleting procedure, concerning the content data recorded on the recording medium, for automatically deleting content data from the recording medium except for the content data being placed under delete-prohibition management.

Meanwhile, a recording medium of the invention recording a computer-readable program, the program being for a recording/reproducing apparatus and including: a managing step of placing one or a plurality of ones of content data equal to or less than the upper limit value of among the content data recorded on the recording medium under delete-prohibition management; and automatic deleting step, concerning the content data recorded on the recording medium, for automatically deleting content data from the recording medium except for the content data being placed under delete-prohibition management.

Meanwhile, a program of the invention for a computer for controlling a recording/reproducing apparatus to execute: a managing step of placing one or a plurality of ones of content data equal to or less than the upper limit value of among the content data recorded on the recording medium under delete-prohibition management; and automatic deleting step, concerning the content data recorded on the recording medium, for automatically deleting content data from the recording medium except for the content data being placed under delete-prohibition management.

According to the present invention of the above, the content data recorded on the recording medium is managed with the content age computed by a lapse time from its recording date-and-time and a genre, and automatically deleted with priority of higher content age. Because the content of a broadcast program or the like can be distinguished in a certain degree depending upon genre whether to preferably save or to be allowed for deletion, content age based on lapse time and genre can be proper index values for automatic deletion.

Meanwhile, the user is allowed to instruct delete-prohibition management on a content not desired for automatic deletion. The content data placed under delete-prohibition management is excluded from a subject of automatic deletion. Thus, automatic deletion the user does not desire is not carried out.

At this time, concerning the delete-prohibition management, an upper limit value is provided. By disabling to placing a great deal of content data under delete-prohibition management, secured is a recording domain during automatic picture-recording or so.

BRIEF DESCRIPTION OF THE DRAWINGS

FIG. 5 is an explanatory figure of a content-status database in the embodiment.

BEST MODE FOR CARRYING OUT THE INVENTION

Figure 1:
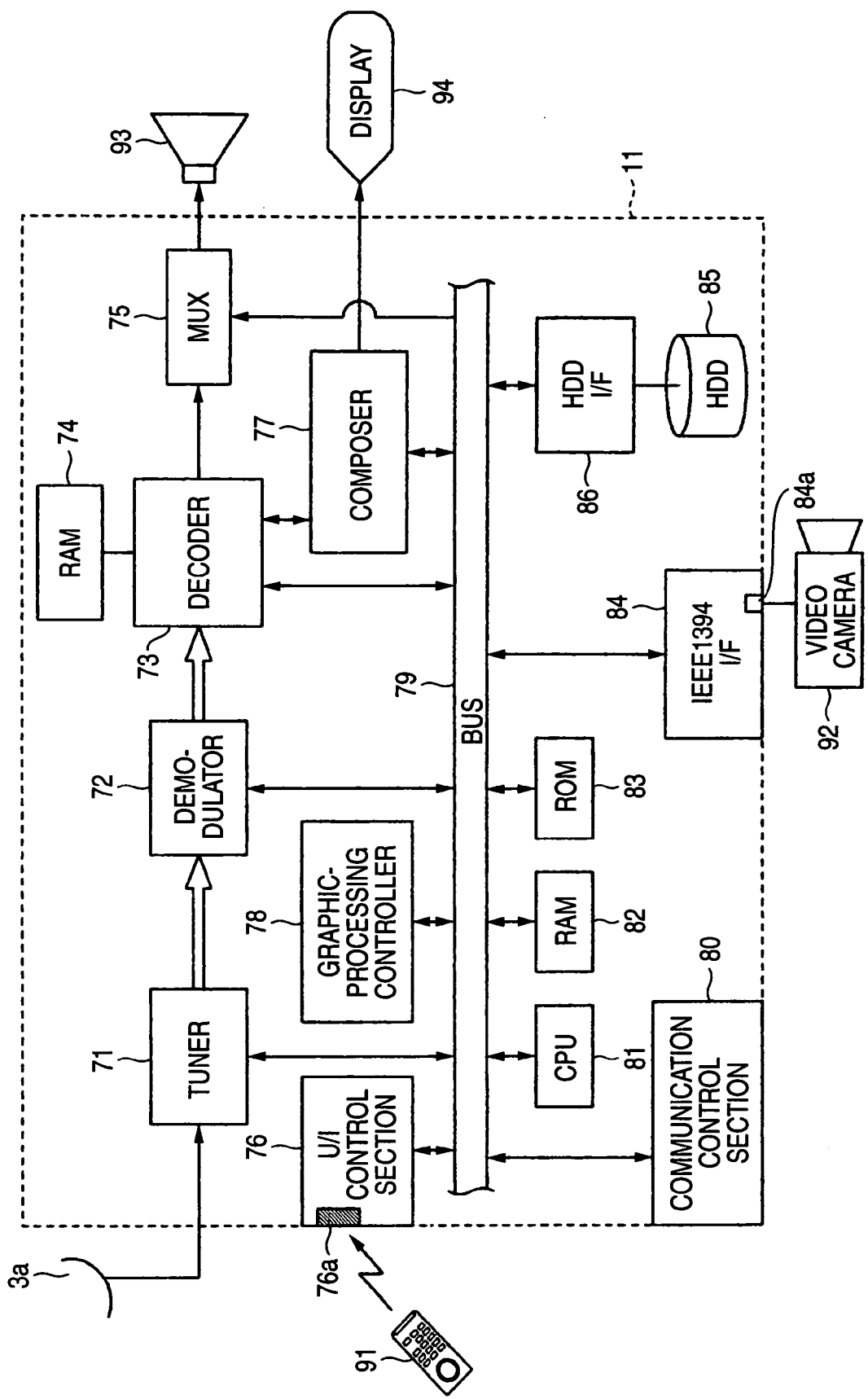
FIG. 1 is a block diagram of a hardware configuration of a recording/reproducing apparatus in an embodiment of the present invention.

Hereunder, explanation will be made on embodiments of the present invention. Incidentally, the recording/reproducing apparatus of this embodiment is assumably configured by a digital satellite broadcast receiver having a recording/reproducing function provided by an HDD drive or the like. Naturally, the recording/reproducing apparatus of the invention is not limited- to the configuration like this. Explanation is in the order as follows:

1. hardware configuration of recording/reproducing apparatus
2. functional block configuration of recording/reproducing apparatus
3. content-age-addition process
4. automatic removal during picture-recording
5. delete-prohibit management
6. picture-recorded content list preparation process
7. other modifications.

1. Hardware Configuration of Recording/Reproducing Apparatus

FIG. 1 shows a hardware configuration of a recording/reproducing apparatus 1 as an embodiment of the present invention.

This recording/reproducing apparatus 11 is an apparatus that a video recording/reproducing function is added to a digital satellite broadcast receiver. A number of video pictures can be recorded to an HDD (hard disk drive) 85 having a huge capacity of storage. Furthermore, user's intention can be correctly grasped and reflected in save management of recorded pictures.

Incidentally, the recording/reproducing apparatus 11 can be mounted as an AV appliance, e.g. can be configured integral with a television receiver such as a set top box.

The broadcast wave, transmitted for example from a communication or broadcast satellite not shown herein as a digital satellite broadcast, is received at a parabolic antenna 3a and supplied to a tuner 71 of the recording/reproducing apparatus 11. This broadcast wave is superposed with electronic program information data (hereinafter, referred to as EPG (Electronic Program Guide) data), according to a regular format.

In the digital satellite broadcast system that the television signal is digitalized and transmitted by the broadcast satellite or the communication satellite so that the broadcast signal is to be received for viewing for example at households, it is possible to secure channels provided nearly 150. Accordingly, a great number of programs are to be aired, as compared to the conventional broadcast for example over terrestrial wave.

For this reason, in the digital satellite broadcast system, electronic program guide (EPG) information being the information on a broadcast program is transmitted in order for positive selection of a desired program from among a number of programs. The digital satellite broadcast receiver end is configured to prepare and display/output a program guide table, on the basis of the data of electronic program guide. The program guide table is configured as a GUI (Graphical User Interface). For example, the user, if making an operation to the program guide table, is allowed to select a desired program.

Also, the EPG contains program genre, e.g. categories such as news, sport and drama. By utilizing the EPG, the program being aired can be managed with grouping based on genre. Accordingly, it is possible to search for a program in a genre desired for viewing from many channels or to automatically record a program in a genre the user likes.

Incidentally, the broadcast wave received may be any including those of wired broadcast and terrestrial waves, besides the digital satellite broadcast wave. Meanwhile, depending upon whether the received broadcast wave is an analog signal or a digital signal, proper modification is necessarily made to the internal configuration of the tuner section as well as the various functional circuit sections to be explained subsequently.

The tuner 71 makes a tuning, or channel selection, to a desired channel of broadcast wave, under control of a CPU 81, and outputs reception data to a demodulator 72.

The demodulator 72 demodulates the digital-modulated reception data and outputs it to a decoder 73.

In the case of a digital satellite broadcast for example, the digital data received from a broadcast wave by the tuner 71 and demodulated by the demodulator 72 is a transport stream multiplexed with the AV data compressed under MPEG2 scheme and the data for data broadcast. AV data is video and audio information configuring a broadcast content main body while data-broadcast data is data attended on a broadcast content main body, i.e. EPG data as noted above.

The decoder 73 separates the transport stream supplied from the demodulator 72 into AV data compressed under MPEG2 scheme and data for data broadcast. The decoder 73 also separates the real-time AV data compressed under MPEG2 scheme into compressed video data and compressed audio data.

The separated audio data is PCM (Pulse Code Modulation)-decoded and thereafter synthesized with additional sound, then being output onto a speaker 93 through a mixer (MUX) 75.

Meanwhile, the separated video data is decompressed and thereafter outputted onto a display 94 through a composer 77.

A RAM 74 can save those of operation data given by the decoder 73.

The speaker 93 outputs the audio signal supplied from the mixer 75. Meanwhile, the display 94 displays (reproduces) the video signal supplied from the composer 77.

The decoder 73 also supplies the data-broadcast data (EPG data) separated from the transport stream, to the CPU81 through the bus 79. This allows the CPU 81 to execute a predetermined process according to a predetermined application, in order for utilization upon preparing an EPG list or reproducing schedule list.

A user-interface control section 76 is a module for processing the input operation of from a user. For example, by operating a remote commander 91 structured by an operation button or switch by the user, the operation signal (IR signal) emitted from an infrared-ray emitting part (not shown) is received at a light-receiving part 76a where it is converted into an input operation signal as an electric signal and outputted to the CPU 81.

Incidentally, of course, an operation switch or the like may be formed on a apparatus housing panel so that the user can operate the operation switch on the panel. In such a case, the operation with the operation switch on the panel is detected by the user-interface control section 76 and supplied as operation information to the CPU 81.

A graphic processing controller 78 is an exclusive controller for generating a screen under control of the CPU 81, which has a high-definition rendering function equivalent to SVGA (Super Video Graphic Array) or XGA (extended Graphic Array), for example.

The graphic processing controller 78 is to render a GUI (Graphical User Interface) operation screen, an EPG list screen, a schedule screen or the like.

These of rendering screen data, in the composer 77, are synthesized with a broadcast video picture, etc. or switched and outputted to the display 94, thereby being displayed to the user.

A communication control section 80 controls wired communications through the telephone line or cable. By communicating with an external server system through the communication control section 80, exchange is made of a broadcast content, EPG data or recommended picture-recording program data. Also, data exchange is carried out by communication with the external appliance through the communication control section 80.

The CPU 81 is a main controller for control over the entire operation of the recording/reproducing apparatus 11, which executes various applications on the platform provided by an operating system (OS).

This CPU 81 carries out a required control for broadcast reception and output, picture-recording/reproducing of contents, broadcast program management using EPG data, management of the contents recorded on the HDD 85, screen-display data generation by the graphic processing controller 78 and soon, on the basis of an operation signal inputted through the remote commander 91 or user-interface control section 76.

A RAM 82 is a writable volatile memory used to load an execution program for the CPU 81 and to write the operation data for the execution program.

A ROM 83 is a read only memory storing a self-diagnosis/initializing program to be executed upon powering on the recording/reproducing apparatus 11, a control code for hardware operation and so on.

An IEEE (The Institute of Electrical and Electronics Engineers) 1394 interface 84 is a serial high-speed interface capable of communicating data at approximately several tens MBps. An IEEE 1394 port 84a is to be connected with an apparatus compatible with IEEE 1394, e.g. a video camera 92, which can carry out data communication with these connected appliances.

The hard disk drive (HDD) 85 is a random-accessible storage device capable of storing programs and data in a predetermined format of file form, which has a large capacity of approximately several tens GB (or 100 GB or greater), for example.

The HDD 85 also is connected to a bus 79 through a hard disk interface 86. Under control of the CPU 81, recorded/reproduced is the data or control information supplied from the decoder 73 or communication control section 80. For example, recorded/reproduced are EPG data, broadcast contents, content status, recommended picture-recording program list, content age, erase prohibiting information and so on. For example, the storage video database 50, the EPG database 43, the content-status database 56 and the like, to be hereinafter referred in FIG. 2 are to be architected on the HDD 85.

The video data, such as of broadcast contents, reproduced from the HDD 85 is supplied onto the display 94 through the composer 77, where it is video-outputted. Meanwhile, the audio data reproduced is supplied to the speaker 93 through the mixer 75, and audio-outputted.

2. Functional Block Configuration of Recording/Reproducing Apparatus

Figure 2:
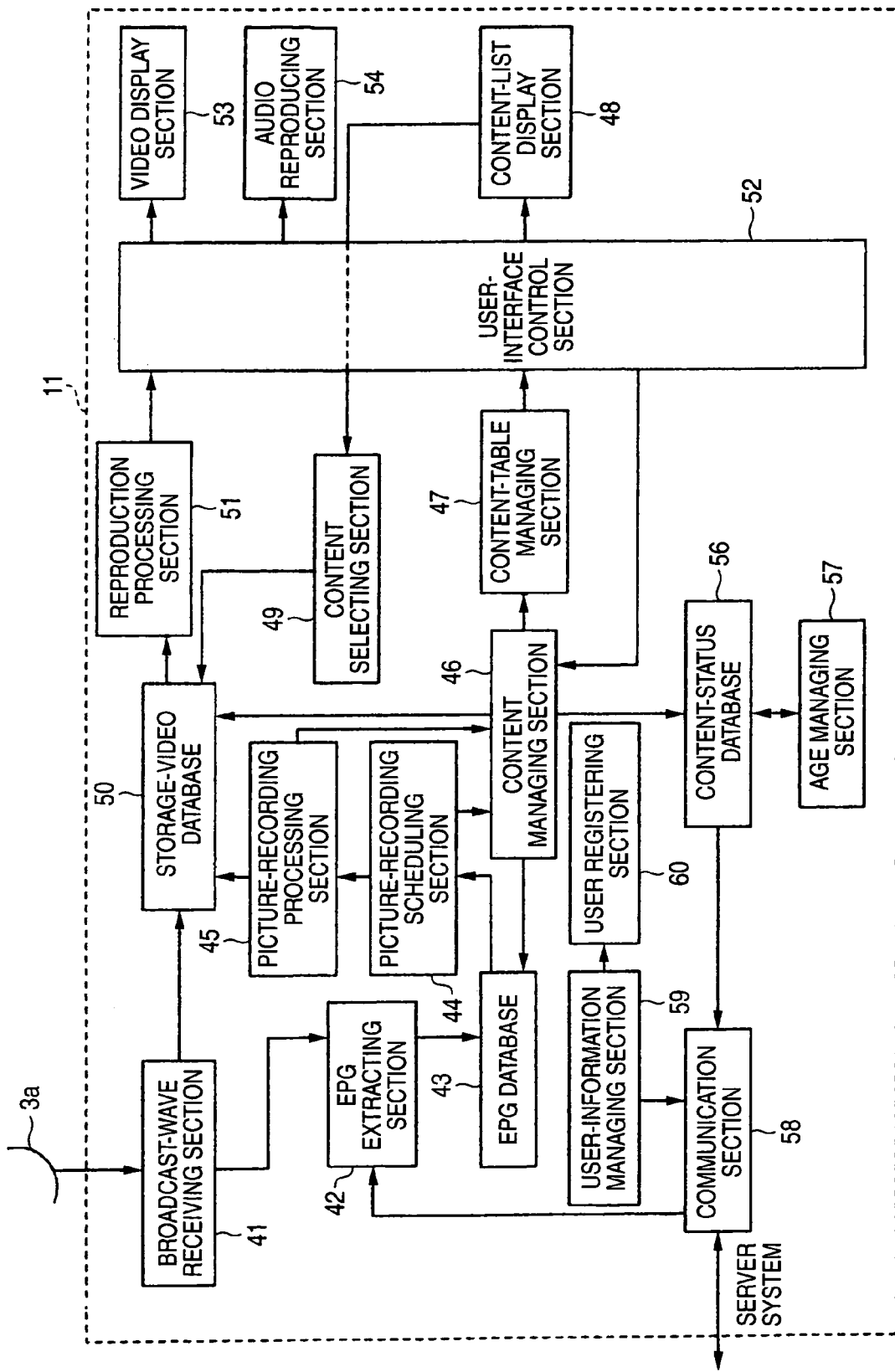
FIG. 2 is a block diagram of a functional configuration of the recording/reproducing apparatus in the embodiment.

FIG. 2 shows a functional block configured for realizing the operations of this embodiment, i.e. mainly picture-recording broadcast programs (content data) and managing the picture-recorded content data, in the recording/reproducing apparatus 11 of the above hardware configuration.

A broadcast-wave receiving section 41 is inputted by a broadcast content and EPG data received by the antenna 3a, and carries out a predetermined process, such as demodulation process and error correction process, on these of data.

Namely, there is shown a function that the tuner 71, demodulator 72 or decoder 73 in FIG. 1 executes under control of the CPU 81.

An EPG extracting section 42 extracts EPG data out of the data received by the broadcast-wave receiving section 41, and stores it to an EPG database 43. Namely, it corresponds EPG data extraction by the decoder 73 in FIG. 1, transfer to the CPU 81, and EPG data write operation function to the EPG database architected on the HDD 85 under control of the CPU 81.

Incidentally, in the case of acquiring EPG data from an external server by Internet communication or the like, the EPG extracting section 42 extracts EPG data as information obtained in a communicating section 58 (communication control section 80 in FIG. 1).

As described above, the EPG data contains titles, genre, channels, airing date-and-time (start/end time and time length (data size) based thereon), performers, commentary, and other various pieces of information, on the broadcast-program (content) basis.

Figures 3, 4:
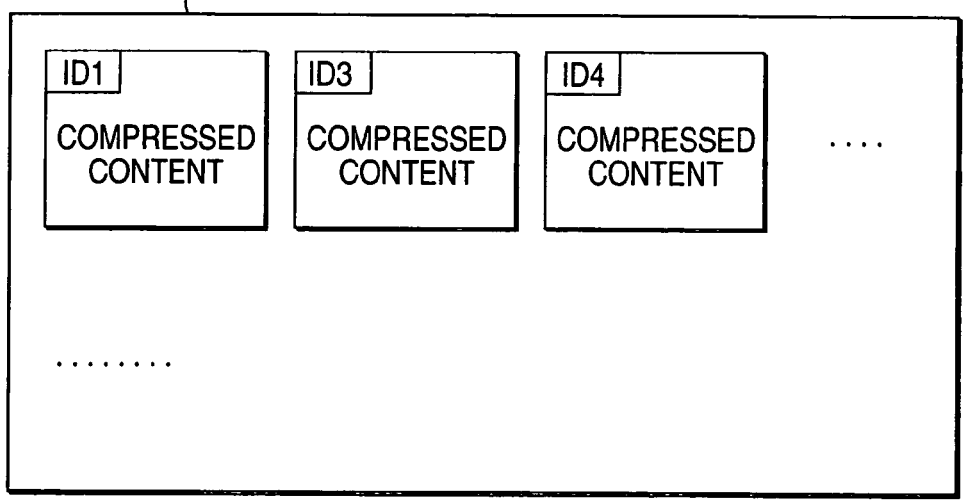
FIG. 3 is an explanatory figure of an EPG database in the embodiment.
FIG. 4 is an explanatory figure of a storage video database in the embodiment.

The EPG database 43 is to store EPG data of those of title, genre and the like of each content, as shown in FIG. 3. Incidentally, in this embodiment, the EPG data of the contents are under management with reference to content IDs (ID1, ID2, . . . ) given on the content-data basis. The content ID is to be used for association with a hereinafter-referred storage-video database 50 and content-status database 56, hereinafter referred.

A picture-recording scheduling section 44 registers (schedules), in advance, a desired broadcast content so that the content to be aired in the future can be picture-recorded in a picture-recording processing section 45.

As registering for picture-recording, carried out is scheduling registration to be executed depending upon the operation that an EPG list is presented to the user so that the user selects a program desired for picture-recording from the EPG list by operating input (registration of scheduled picture-recording based on user's intention), or scheduling registration for automatically performing picture-recording depending upon user's taste, habits and the like (registration for automatic picture-recording not based upon user's operation). Meanwhile, there are cases to register the scheduling of a recommended program provided by service, through the communicating section 58.

The function of the picture-recording scheduling section 44 is realized by the process of the CPU 81. Meanwhile, the information of scheduling registration is stored to the HDD 85. Otherwise, in case there is provided a non-volatile memory such as flash memory the CPU 81 is to access, registration information may be stored to the flash memory or the like.

The picture-recording processing section 45 is a function that, when a broadcast content scheduled for picture-recording by the picture-recording scheduling section 44 is aired, the content is picture-recoded to the HDD 85. The picture-recording processing section 45 can manually or automatically picture-record the content currently being aired. On this occasion, automatic content deletion is made in order to secure a free capacity required in picture-recording.

The processing at a start of picture-recording, particularly automatic deletion process for securing the capacity, is hereinafter described with reference to FIG. 7.

The function of the picture-recording processing section 45 is realized by the operation of the CPU 81, HDD interface 86 and HDD 85.

The contents, to be picture-recorded onto the HDD 85 by the function of the picture-recording processing section 45, are recorded as data files of the storage-video database 50 in the HDD 85.

Namely, the storage-video database 50 stores the contents picture-recorded by the picture-recording processing section 45, as shown in FIG. 4. The video data to be stored to the storage-video database 50 is recorded in an MPEG2 (Moving Picture Experts Group 2) compression form, associatively with broadcast channel, airing date-and-time (picture-recording date-and-time) or the content ID acquired from the EPG data.

A content managing section 46 provides a correspondence between the individual pieces of content information (EPG data content) stored in the EPG database 43 and the individual ones of video data stored in the storage video database 50.

This correspondence uses content IDs, for example. As shown in FIGS. 3 and 4, the same content ID is previously recorded in both the EPG database 43 and the storage video database 50.

In FIG. 4 for example, there is shown a state that the contents of ID1, ID3, ID4 are recorded as content IDs in the EPG database 43. However, in the storage video database 50, by attaching the content IDs to the compressed content files, the state is in association with the EPG data content corresponding to each of content data (compressed content file) actually picture-recorded.

Incidentally, within the compressed content file, the corresponding EPG data content may be recorded.

Meanwhile, concerning the content data picture-recoded or scheduled for picture-recording, the status data of that content is notified from the picture-recording scheduling section 44 or picture-recording processing section 45 to the content managing section 46.

The content information (EPG data) and the video data (compressed content files), placed in correspondence as in the above, are collectively managed together with the content status data such as "scheduled for picture-recording", "picture-recorded", etc.

In the content status data, also stored are content "delete prohibition" information, "content age" information, content "storage capacity" and "recording date-and-time".

Namely, by the content managing section 46, a content-status database 56 as shown in FIG. 5 is architected for example in the HDD 85.

Each content is registered to the content-status database 56 by the content managing section 46.

For example, in the content-status database 56, the contents scheduled for picture-recording and the contents picture-recorded are managed with reference to the content IDs. For each content, the information of scheduled for picture-recording/picture-recorded is recorded as a content status.

Meanwhile, although hereinafter referred, delete prohibition information is recorded in accordance with user's designation on delete-prohibition.

Also, content age is held while being updated by the age managing section 57.

Meanwhile, content capacity (data size and time length) is recorded.

Meanwhile, date-and-time information is recorded. As date-and-time information, recorded are e.g. date-and-time of content picture-recording to the HDD 85 (schedule date-and-time of picture-recording), information update date-and-time in the relevant content-status database 56, e.g. content state, delete prohibition information, and information update date-and-time of content age and the like.

Meanwhile, the content managing section 46 provides content "storage capacity" and "recording date-and-time", and content "delete-prohibition" information and "age" information to the picture-recording processing section 45 while managing the content-status database 56. The picture-recording processing section 45 makes reference to these pieces of information during an automatic deletion process, hereinafter referred.

The function as the content managing section 46 is realized by the processing of the CPU 81.

The age managing section 57 makes an age-adding process on the recorded content as hereinafter referred in FIG. 6, to add age to the content. Then, update is made to the content age information in the content-status database 56.

Meanwhile, the age managing section 57 makes reference to the content-status database 56 on the basis of the content ID supplied from the user-interface control section 52 in order for the hereinafter-referred process of FIG. 9 and other processes, and reads out the age data corresponding to the content and sends it back to the user-interface control section 52.

The function as the age managing section 57 is realized by the processing of the CPU 81.

A content-table managing section 47 prepares an EPG list, a picture-recorded content list, a reproducing schedule table and the like.

A content-list display section 48 causes the display 94 to display an EPG list, picture-recorded content list or reproducing schedule table inputted from the content-table managing section 47 through the user-interface control section 52.

The function of the content-table managing section 47 and content-list display section 48 is realized by the processing of the CPU 81, graphic process controller 78, composer 77 and the like.

A content selecting section 49 specifies a content selected by user's cursor operation on the picture-recorded title list or the like displayed on the display 94 by the content-list display section 48.

The video data corresponding to the specified (selected) content is read out of the storage video database 50 and outputted to a reproduction processing section 51.

The reproduction processing section 51 reads out the video data (compressed content files) stored in the storage video database 50, and separates it into a video and an audio and decompresses those by an MPEG scheme.

Namely, the content selecting section 49 and reproduction processing section 51 has a function for reproducing/outputting a picture-recorded content, which is realized by the processing of the CPU 81, user-interface control section 76, decoder 73, composer 77, mixer 75, etc. of FIG. 1.

The user-interface control section 52 controls how to present a list of video data or content information (e.g. program names) to the user.

Namely, the user-interface control section 52 inquires of the age managing section 57 as to the content ID of a content selected by the content selecting section 49, to acquire the corresponding content age, and changes the content presenting way on the basis of the age. This changes the title character size and color of each content, the deleting mark to be displayed nearby a title, and so on.

Meanwhile, the user-interface control section 52 allows the user to input a "delete-prohibition" mark for each content. The content attached with the mark is not a subject of automatic deletion.

The content, the user has inputted a delete-prohibition mark, is recorded by delete-prohibition information in the content-status database 56, i.e. managed as delete-prohibited content.

This embodiment provides an upper limit of the total amount of the contents put with "delete-prohibition" marks, thereby preventing a great deal of contents from being unnecessarily placed under delete-prohibition management. By this devising, the capacity required in picture-recording is made secured on the HDD 85 at all times.

The process concerning delete-prohibition input is hereinafter referred in FIG. 8.

The video display section 53 displays (reproduces) the video inputted from the reproduction processing section 51 through the user-interface control section 52.

The audio reproducing section 54 outputs (reproduces) the audio inputted from the reproduction processing section 51 through the user interface 52.

The communicating section 58 controls the wireless communications through telephone lines or cables. By communications with the service-providing server system through the communication section 58, it is possible to obtain EPG data, a list of recommended picture-recording programs and the like. Using the list, the picture-recording scheduling section 44 can register the scheduling for automatic picture-recording.

A user-information managing section 59 enables to input or change user information (e.g. user ID, password, name, address, liking, etc.). By sending these pieces of information to the server system for providing service, it is possible to receive a distribution of a list of recommended picture-recording programs suited for the user.

A user-information registering section 60 registers the user information (e.g. user ID, password, name, address, liking, etc.) inputted by the user. The user information registered is sent to the server system through the user-information managing section 59 and communicating section 58. Due to this, user information (customer information) entries are added or changed in the customer database within the server system.

3. Content Age Adding Process

As can be seen from the above functional configuration, in the recording/reproducing apparatus 11 of this embodiment, the EPG data on broadcast programs (contents) are managed in the EPG database 43. Meanwhile, when a content is picture-recorded, the content is stored as a compressed content file to the storage video database 50. Each compressed-content file and each of EPD data are placed in a corresponding state through a content ID, for example.

Furthermore, the content picture-recoded or the content scheduled for picture-recording is associated by a content ID, and various pieces of information are managed in the content-status database 56.

It was already described that, as management of the contents recorded on the HDD 85, the management of automatically deleting unnecessary contents is important in order to secure a recording capacity in performing picture-recording.

This embodiment uses content age as an index for selecting a content to be deleted during the automatic deletion. Content age is recorded to a content-status database 56, and age-addition-processed by an age managing section 57. The content age is given as a value computed depending upon a lapse time from content recorded date-and-time and a genre of that content.

Figure 6:
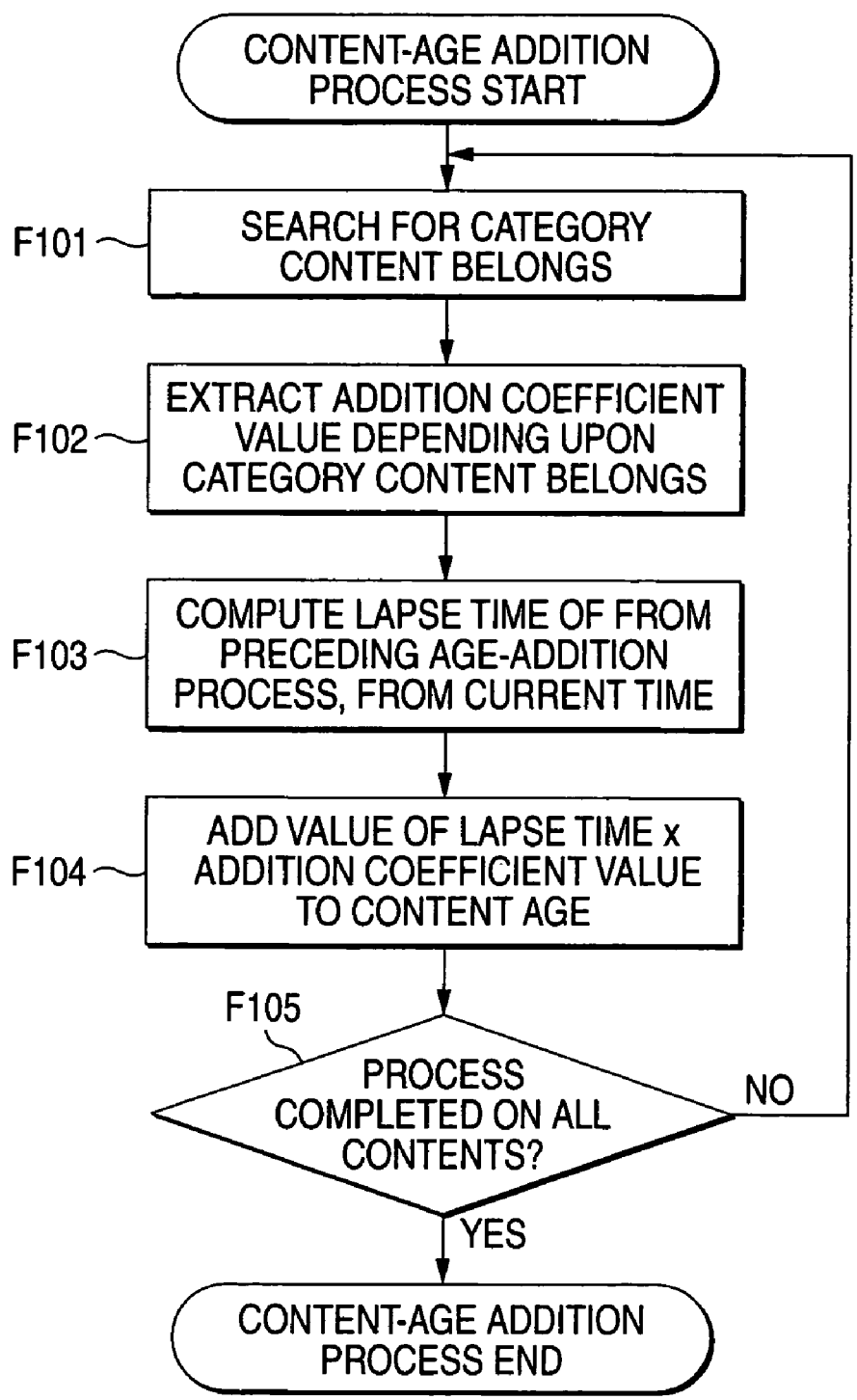
FIG. 6 is a flowchart of a content-age-addition process in the embodiment.

Namely, the age managing section 57 sequentially execute a process of adding/updating content age to each content rendered picture-recorded within the content-status database 56, which process is shown in FIG. 6.

The age managing section 57 updates the age of each content picture-recorded of within the content-status database 56, according to an algorithm as shown in FIG. 6.

The update timing of content age is suitably at an interval of several ten minutes to several hours, for example.

The age managing section 57, in step F101 in the processing of FIG. 6, inquires of the content managing section 46 and searches for a category to which each content belongs.

The age managing section 57, carries out a content-age update process on every content, as a subject, whose information of content status is rendered "picture-recorded" in the content-status database 56. In step F101, however, it designates one of the contents picture-recorded, to search for a category. In this case, the content managing section 46 searches through the EPG database on the basis of a content ID and obtains genre information of the relevant content, thereby notifying the age managing section 57 of the category (genre) of the content.

The age managing section 57 holds addition coefficients for category-based addition process. Although broadcast program category includes news, drama, variety, sports, music, movie and so on, the coefficients concerning age addition are set in accordance with these genres. For example, the genre having a high real-time nature, e.g. news, lowers in its content importance as time passes. Meanwhile, in music or the like, there is a content the user desires for repetitive viewing. For example, concerning the music video on an artist in user's favor, importance degree does not lower with the lapse of time.

In order to reflect such genre-based natures upon content age, high coefficient value is set for news or the like while low coefficient value is set for music content or the like.

The genre-based coefficient value may be set beforehand. Otherwise, the user is preferably allowed to set and change the coefficient value so that addition coefficient value can be made low for the genre the user desires saving possibly long in time.

The age managing section 57, in step F102, extracts an addition coefficient value in accordance with the content category.

In step F103, computed is a lapse time, on the current date-and-time, of from the date-and-time the content age has been updated last time. Namely, reference is made to the information of update date-and-time of within the content-status database 56, to compute a lapse time from that update date-and-time.

In step F104, the computed lapse time is multiplied by the extracted addition coefficient value, thereby determining an age value for addition. Then, the age value for addition is added to the content age value recorded in the content-status database 56, to have a new content age. Thus, update is made to the content age value of within the content-status database 56. On this occasion, the information of update date-and-time is updated into the current time.

In step F105, determination is made as to whether content age update as above has completed or not on all the content data recorded to the HDD 85. If not completed, the process returns to step F101, to carry out an age-addition process to the next content data.

After the age-addition process of steps F101-F104 is done on all the content data picture-recorded and the content age values in the content-status database 56 are updated, the process is terminated from step F105.

By carrying out such a content-age-addition process, content age advances faster on the content higher in current-affair nature and allowed to be deleted earlier, e.g. news. Meanwhile, content age advances slowly on the content desirably held comparatively long in time, e.g. drama, movie and music programs.

Naturally, in case the coefficient dependent upon genre is allowed for the user to set/change, content age advancement can be set for the genre desired for saving long in time and the genre allowed for earlier deletion depending upon user's intention.

4. Automatic Deletion in Picture-Recording

The picture-recording processing section 45 makes a processing of picture-recording a broadcast program to the HDD 85, depending upon the scheduling for picture-recording (scheduling for picture-recording by user's operation, or automatic scheduling for picture-recording) in the picture-recording scheduling section 44 or user's manual operation of picture-recording.

During carrying out picture-recording, when the remaining capacity for recording on the HDD 85 is insufficient, automatic deletion process is also made to the contents recorded on the HDD 85.

Figure 7:
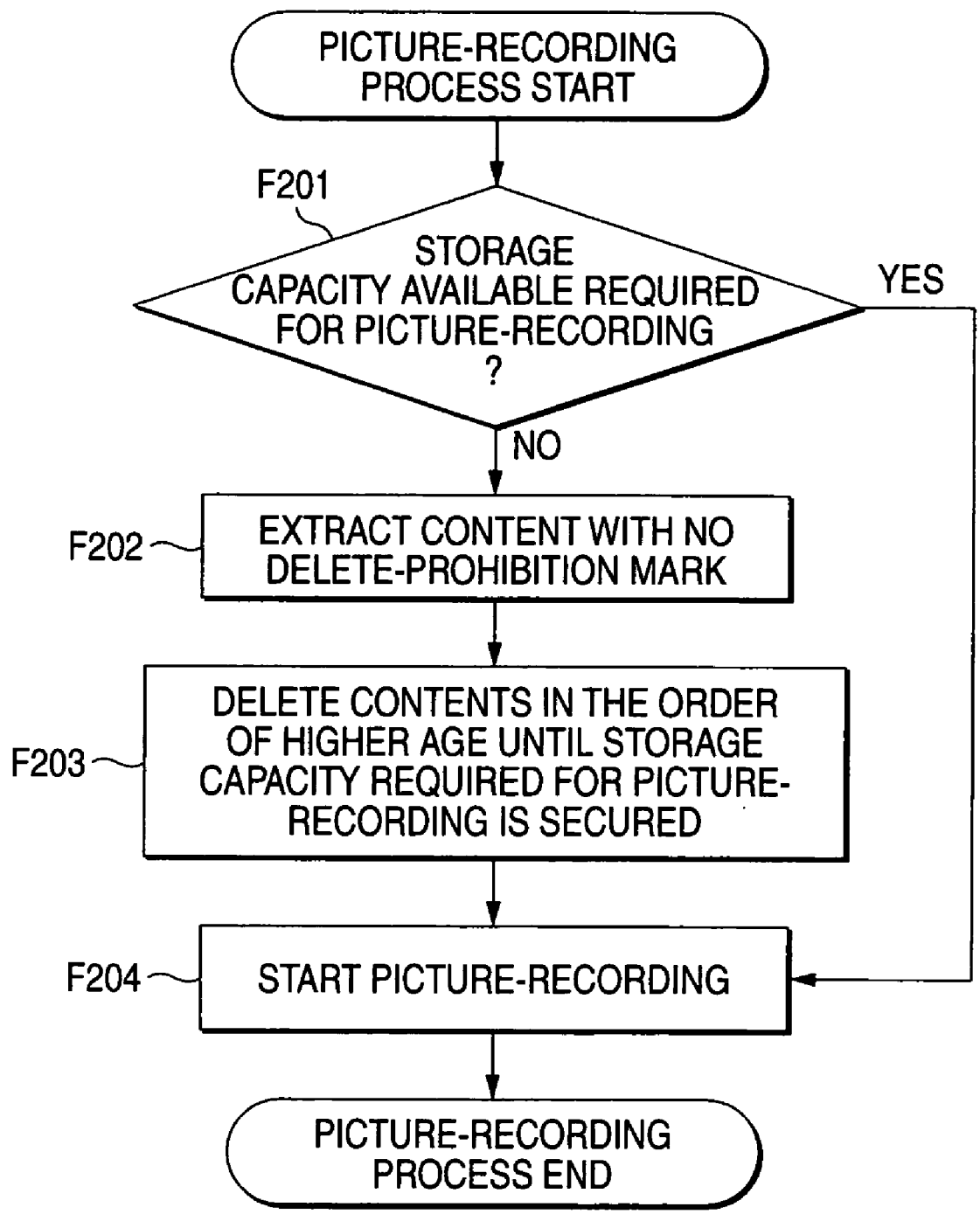
FIG. 7 is a flowchart of an automatic deletion at a start of picture-recording in the embodiment.

For this reason, the picture-recording processing section 45 carries out a process of FIG. 7 when executing picture-recording depending upon a schedule registration or an operation.

At first, during carrying out picture-recording, confirmation is made in step F201 as to whether or not there is left, on the HDD 85, a storage capacity required for the picture-recording of a content in this time. The data size of the content data to be picture-recorded can be determined by a recording date-and-time (start·end time/data size), in the EPG data of the content, recorded in the EPG database 43. Accordingly, the recordable capacity of the HDD 85 is determined to confirm whether or not it is greater than the data size of the content to be picture-recorded.

In case a storage capacity required in picture-recording can be secured on the HDD 85, the process proceeds to step F204, to start a picture-recording process.

Meanwhile, in the case that a storage capacity required for picture-recording cannot be secured on the HDD 85, automatic deletion process is made in step F202, F203.

In step F202, extracted is a content rendered picture-recorded of within the content-status database 56, and furthermore extracted is a content not under delete-prohibition management of among the picture-recorded contents.

Delete-prohibition management refers to management on the content the user designated as delete-prohibition by putting delete-prohibition information in the content-status database 56. Delete-prohibition management is hereinafter referred.

In step F202, after extracting a content picture-recorded and moreover not under delete-prohibition management, automatic deletion is carried out in step F203.

In this case, all the extracted contents not under delete-prohibition management are checked for content age. Until securing a storage capacity required for picture-recording, processing is made to delete the content in the order of higher content age from the HDD 85 (step F203).

Namely, the content highest in content age is first deleted. In the deletion state, the HDD 85 recordable capacity is confirmed and determination is made as to whether or not the picture-recording in this time has become possible. In case the capacity for picture-recording is secured, automatic deletion is completed. In case it cannot be secured, deleted is the content next higher in content age. Confirmation is again made as to whether the capacity for picture-recording is secured or not.

In this manner, automatic deletion is made in the order of higher content age, to secure a capacity for the picture-recording in this time.

After securing the capacity on the HDD 85 by the automatic deletion process like this, the process proceeds to step F204, to start a picture-recording process.

The picture-recording processing section 45 carries out automatic deletion as required in this manner, whereby picture-recording is executable at all times.

Meanwhile, by making it possible to always secure a recording domain required in carrying out picture-recording, it is possible to automatically picture-record, at all times, a program recommended by the system or a program recommended by a service connected to the network.

Meanwhile, because the contents prohibited from being deleted by the user are excluded from the subject of automatic deletion, there is no possibility of making a deletion not intended by the user.

Meanwhile, although hereinafter referred, because the upper limit is provided to the content to be under delete-prohibition management, such a situation does not occur that there is no content to be automatically detected and hence capacity for picture-recording cannot be secured.

Meanwhile, automatic deletion is carried out in the order of from the one higher in the content age added an age by the above process of FIG. 6. As per the above, because content age is to be added an age depending upon the lapse time from a recording date-and-time and upon the genre, automatic deletion is carried out comparatively in the order of lower importance of saving. Thus, selected is properly a content to be automatically deleted.

It is natural that it can be approximated to user-intended automatic deletion by adjusting the age-adding algorithm.

5. Delete-Prohibition Management

By the process of the user-interface control section 52 and content managing section 46, management of content delete-prohibition is made in accordance with user's operation.

Figure 8:
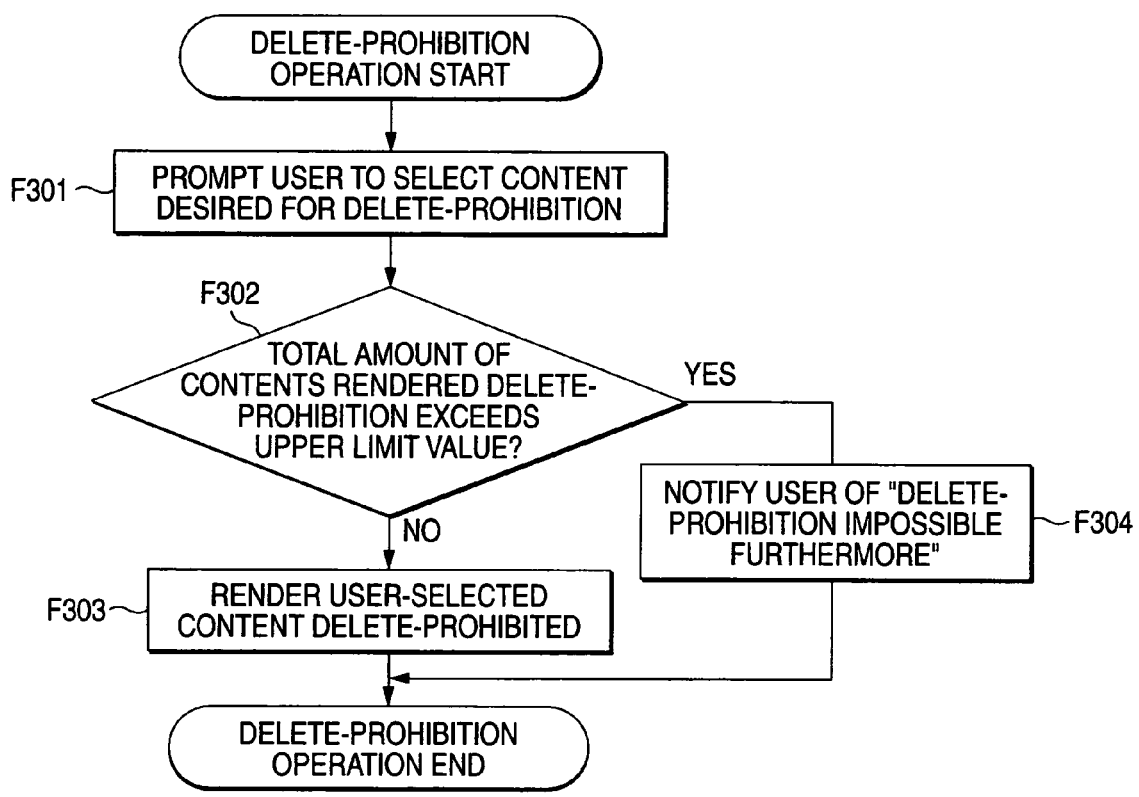
FIG. 8 is a flowchart of a delete-prohibition management in the embodiment.

The process in this case is shown in FIG. 8.

The user-interface control section 52 presents the user with a picture-recorded content list prepared by the content-table managing section 47 by the content list display section 48, as step F301. The user is prompted to select a content desired for delete-prohibition.

The user operates a graphical user interface (GUI) provided by the user-interface control section 52, and selects a content desired for "delete-prohibition" from the list of content information (e.g. program name).

After the user makes an input designating a content instructing for delete-prohibition, the user-interface control section 52 notifies the content managing section 46 of the input information. The content managing section 46, instep F302, determines whether or not the total amount of the content for delete-prohibition management exceeds an upper limit value.

The upper limit value is set, for example, at a certain percentage value relative to the total amount prepared for picture-recording content data onto the HDD 85, for example at 50% of the above total amount.

The content managing section 46 can compute the total capacity of the contents already placed under delete-prohibition management, by computing the total capacity of the contents now being under delete-prohibition management in the content-status database 56. Consequently, the total capacity is added by the capacity (data size) of the contents newly designated this time by the user, whereby it is determined whether or not the added capacity value exceeds the capacity value as the above upper limit value.

In case the total capacity of the contents to be placed under delete-prohibition management even if added by the capacity of the content designated this time does not exceed the upper limit value, the process proceeds to step F303, to place the user-designated content under management of delete-prohibition. Namely, concerning the relevant content, delete-prohibition information is written in the content-status database 56.

Meanwhile, in the case determined that the total capacity of the contents to be placed under delete-prohibition management exceeds the upper value if the capacity of the content designated this time is added, delete-prohibition management is considered impossible and hence the process proceeds to step F304. Namely, the content managing section 46 notifies the user-interface control section 52 of the impossibility of delete-prohibition management. The user-interface control section 52 presents the user with a message not to allow delete-prohibition furthermore.

In this manner, the user can prevent the content not desired for deletion from being automatically deleted by designating delete-prohibition if it is within the upper limit value. This is because the contents placed under delete-prohibition management are excluded from the subject of automatic deletion in the above step F202 of FIG. 7.

Meanwhile, by taking the total capacity of the contents to be placed under delete-prohibition management at the upper limit, e.g. 50% of the total capacity of content recording to the HDD 85, such a situation can be prevented that there is no room for automatic deletion and picture-recording becomes impossible to carry out. Namely, by the above process of the above FIG. 7, picture-recording can be carried out positively.

Incidentally, it is naturally possible for the user to release a certain content from delete-prohibition. For example, in the case that the content the user intended for delete-prohibition is determined not to be delete-prohibited in the above step F304 of FIG. 8, the user may select a content allowed for deletion among the contents already placed under delete-prohibition management and release it from delete-prohibition management. This provides an allowance relative to the upper limit value, enabling new delete-prohibition management.

6. Picture-Recorded Content List Preparation Process

In the meanwhile, this embodiment carries out automatic deletion in the order of higher content age as required, i.e. in the case sufficient capacity cannot be secured on the HDD 85 when to make a picture-recording.

Although content age is dependent upon a lapse time from recording date-and-time and a genre, there is a possibility that the content the user not intended for deletion be automatically deleted in a certain case. For example, the content age of news or the like advances fast, as in the foregoing. However, such an exceptional affair possibly occurs that the user desires not to delete but to leave only a certain particular news content.

Meanwhile, although automatic deletion itself is not problematic, there is a demand that the user desirably grasps which content is to be automatically deleted.

For this reason, this embodiment makes it possible to present the user with the contents, in the picture-recorded content list, to be automatically deleted with high possibility.

Figure 9:
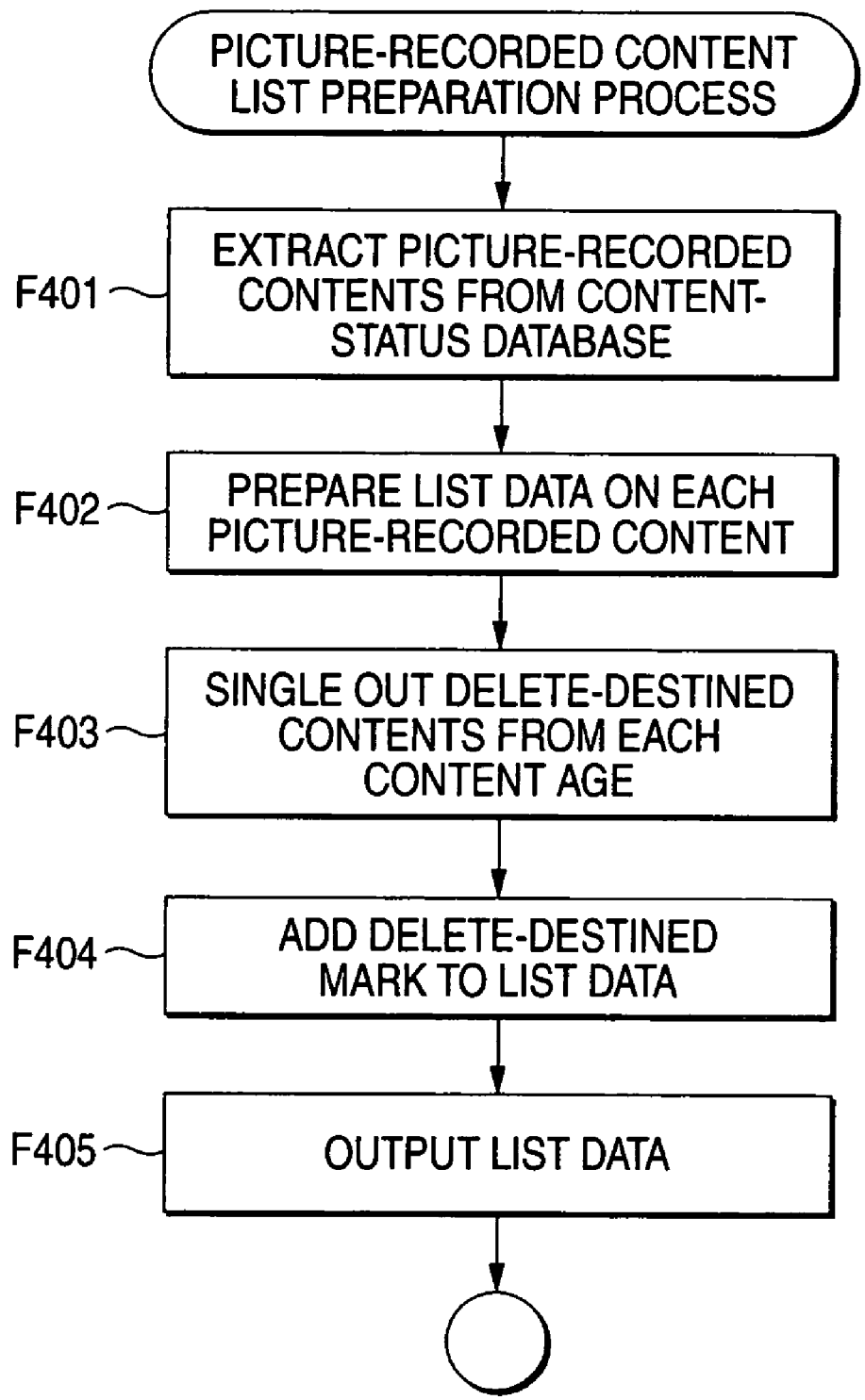
FIG. 9 is a flowchart of a picture-recorded content list preparing process in the embodiment.

Consequently, a process as in FIG. 9 is carried out in the content-list managing section 47 and user-interface control section 52.

At first, step F401, F402 represents a process of preparing the data for a picture-recorded content list in the content-list managing section 47.

Namely, in step F401, reference is made to the content-status database 56, to extract all the contents having a content status rendered "picture-recorded".

Then, for the extracted content, prepared in step F402 is list data including information, e.g. program name and airing date-and-time, by using the information recorded in the content-status database 56 and information recorded in the EPG database 43. This is delivered to the user-interface control section 52.

The user-interface control section 52, in step F403, checks the contents listed in the list for content age. For example, the user-interface control section 52 inquires of the age managing section 57 a content age of each content listed in the list. From a result of it, some contents are selected in the order of higher content age.

In step F404, one or a plurality of contents selected in the above, i.e. the contents having high content age, are added by a delete-destined mark on the list data.

In step F405, the list data added with delete-destined marks is outputted and displayed on the content-list display section 48.

By thus displaying a picture-recorded content list, the user is allowed to know a content to be possibly deleted soon. Also, in case the contents destined for deletion includes a content not desired for deletion, it can be coped with, for example, by making an inputting of delete-prohibition at that time.

Incidentally, when extracting the delete-destined content in step F403, in case the number of contents destined for deletion is set depending upon the schedule situation for picture-recording, the remaining capacity on the HDD 85, and so on, it becomes more correct schedule information.

For example, the data size of a content being scheduled for picture-recording can be known from EPG data. Accordingly, the capacity requiring automatic deletion is computed from the current recordable capacity on the HDD 85 and the data size of the next content scheduled for picture-recording. The contents in an amount requiring deletion for obtaining that capacity may be scheduled for automatic deletion.

7. Modifications

Although the embodiment of the present invention was explained in the above, the invention is not limited to the above embodiment but various examples can be considered.

In the above embodiment, content delete-prohibition management is made depending upon a user's designation for delete-prohibition, wherein the contents not under delete-prohibition management are to be automatically deleted on the basis of content age.

Modification can be realized as a recording/reproducing apparatus employing this one process.

For example, as a recording/reproducing apparatus for carrying out content delete-prohibition management within an upper limit value range in accordance with user's designation for delete-prohibition, it is possible to consider an example that automatic deletion is made from those not under delete-prohibition management, with reference to only recording date-and-time.

Meanwhile, it is possible to consider an example that designation for delete-prohibition is not made but content management is made based on content age.

In such a case, although all the contents possibly reach the highest age in due course, it can be considered that the user is allowed to reset the age for those not desired for deletion or cancel the addition process.

Meanwhile, in the above embodiment, automatic deletion is to be made if necessary during carrying out picture-recording, the timing of carrying out automatic deletion can be considered in variety. For example, it can be considered to carry out automatic deletion when the capacity of the HDD 85 becomes a certain degree or lower. Furthermore, it is possible to consider a scheme to carry out automatic deletion at a regular interval or depending upon user's operation irrespective of the HDD capacity or picture-recording operation.

Meanwhile, although the upper limit value of the content capacity to be placed under delete-prohibition management was taken for example 50% of the total picture-recording capacity on the HDD 85, this upper limit value can be set in variety. Meanwhile, the user may desirably set an upper limit value.

Meanwhile, concerning the contents recorded on the HDD 85, although required information is managed in association with the content-status database 56 and EPG database 43, these database configuration is not limited to.

For example, EPG data, content status, delete-prohibition information, etc., may be recorded within a file of a content itself or in a management file of a content file.

Meanwhile, the invention is applicable to various data recording/reproducing apparatuses for multimedia contents, i.e. moving video images, still video images, sound, texts, programs and so on, besides picture-recording broadcast program contents.

Furthermore, although the above embodiment was configured having the recording/reproducing section in the digital satellite broadcast tuner, it is possible to consider a configuration as a recording/reproducing apparatus not having a tuner function but connected to a tuner unit or another AV appliance or to an information processing apparatus.

As can be understood from the above explanation, according to the invention the content data recorded on the recording medium is automatically deleted with a priority of the higher content age processed of age addition depending upon a lapse time from recording execution date-and-time and a genre. Because the content of a broadcast program or the like can be distinguished in a certain degree depending upon genre whether to preferably save or to be allowed for deletion, content age based on lapse time and genre is proper index values for automatic deletion, i.e. there is an effect that proper automatic deletion can be implemented.

Meanwhile, in automatic deletion, because deletion is made with a priority of the content data having higher content age on the basis of the remaining capacity for recording on the recording medium and the capacity required for the content data to be recorded on the recording medium, automatic deletion is effected in required amount during required time. Namely, there is no possibility of an occurrence that improper or excessive automatic deletion is made unnecessarily to possibly lose the contents necessitated by the user.

Also, by singling out the content data destined for automatic deletion depending upon content age and outputting the display data containing the content notifying of destined automatic deletion, the user can be informed of a possibility of automatic deletion. For example, the user, if desires not to delete the content data destined for automatic deletion, can take a proper measure by placing that content data under delete-prohibition management.

Meanwhile, delete-prohibition management is made possible for the content data recorded on the recording medium. For example, delete-prohibition management is possible by user's operation input instructing a delete-prohibition on the content data desired not to be deleted. By excluding the content data placed under delete-prohibition management from the subject of automatic deletion, the content data needed by the user can be prevented from being automatically deleted. Namely, improper automatic deletion for the user can prevented.

Because of automatic deletion based on content age and of automatic deletion by content age while not carrying out content data deletion not intended by the user on the basis of delete-prohibition management, optimal content management can be realized.

Meanwhile, concerning delete-prohibition management, the upper limit value is provided so that a great deal of content data cannot be placed under delete-prohibition management unnecessarily, thereby securing a recording region during automatic picture-recording or so.

From the above, proper content data as a subject of deletion is selected and deleted without imposing heavy operation burden on the user during automatic deletion. Because this can positively secure the remaining capacity for recording on the recording medium, it is suited as recording management in a large-capacity multimedia-content storage apparatus.

The invention claimed is:

1. A recording/reproducing apparatus characterized by comprising:
    recording/reproducing means capable of recording inputted content data to a recording medium and reproducing content data from the recording medium; wherein the recording/reproducing means records content data of recommendations provided by a service to the recording medium;
    content-status managing means for managing a content age as a value age-addition-processed on the content data recorded on the recording medium, depending upon a lapse time from a recording execution data-and-time and a genre of the content data; wherein a genre-based coefficient value is set/changed when the content age is age-addition-processed; and
    automatic-deletion control means for making reference to the content age under management of the content-status managing means as to the content data recorded on the recording medium, and automatically deleting the content data with priority of higher content age from the recording medium.

2. A recording/reproducing apparatus according to claim 1, wherein the automatic-deletion control means carries out deleting the content data with priority of higher content age, on the basis of a remaining recordable capacity of the recording medium and a capacity required for content data to be recorded to the recording medium.

3. A recording/reproducing apparatus according to claim 1, wherein the content-status managing means is adapted to make a delete-prohibition management on the content data recorded on the recording medium, and
    the automatic-deletion control means carries out deleting the content data with priority of higher content age, excepting the content data placed under delete-prohibition management in the content-status managing means.

4. A recording/reproducing apparatus according to claim 3, wherein the content-status managing means places under delete-prohibition management content data that an operation input instructing delete-prohibition has been done of among the content data recorded on the recording medium.

5. A recording/reproducing apparatus according to claim 3, wherein, when carrying out delete-prohibition management on the content data, provided is an upper limit value of a total amount of content data to be placed under delete-prohibition management.

6. A recording/reproducing apparatus according to claim 5, wherein, in a case determined that the total amount of content data to be placed under delete-prohibition management exceeds the upper limit value, notification is made of a fact delete-prohibition management is impossible.

7. A recording/reproducing apparatus according to claim 5, wherein the upper limit value of a total amount of content data to be placed under delete-prohibition management is to be previously set or desirably set.

8. A recording/reproducing apparatus according to claim 1, further comprising display-data output means for outputting display data including a matter informing that content data scheduled for automatic deletion is singled out of the content data recorded on the recording medium on the basis of the content age under management of the content-status managing means, and automatic deletion is scheduled on the singled-out content data.

9. A recording/reproducing apparatus according to claim 1, wherein the recording/reproducing means automatically records content data in a genre a user likes to the recording medium.

10. A recording/reproducing apparatus according to claim 1, wherein the recording/reproducing means records content data selected from a list of information of the content data by a user's operation input to the recording medium.

11. A recording/reproducing apparatus according to claim 1, wherein the recording/reproducing means records the content data in a compression form to the recording medium.

12. A record managing method characterized by comprising:
    a managing procedure of managing a content age as a value age-addition-processed on content data recorded on the recording medium, depending upon a lapse time from a recording execution data-and-time and a genre of the content data; wherein the content data recorded on the recording medium corresponds to recommendations provided by a service and a genre-based coefficient value is set/changed when the content age is age-addition-processed; and
    an automatic deleting procedure of making reference to the content age as to the content data recorded on the recording medium, and automatically deleting the content data with priority of higher in the content age from the recording medium.

13. A recording medium recording a computer-readable program, the program being for a recording/reproducing apparatus and characterized by including:
    a managing step of managing a content age as a value age-addition-processed on content data recorded on the recording medium, depending upon a lapse time from a recording execution data-and-time and a genre of the content data; wherein the content data recorded on the recording medium corresponds to recommendations provided by a service and a genre-based coefficient value is set/changed when the content age is age-addition-processed; and an automatic deleting step of making reference to the content age as to the content data recorded on the recording medium, and automatically deleting the content data with priority of higher in the content age from the recording medium.

14. A program for a computer recorded in a computer readable medium for controlling a recording/reproducing apparatus to execute:

a managing step of managing a content age as a value age-addition-processed on content data recorded on the recording medium, depending upon a lapse time from a recording execution data-and-time and a genre of the content data; wherein the content data recorded on the recording medium corresponds to recommendations provided by a service and a genre-based coefficient value is set/changed when the content age is age-addition-processed; and an automatic deleting step of making reference to the content age as to the content data recorded on the recording medium, and automatically deleting the content data with priority of higher content age from the recording medium.

15. A recording/reproducing apparatus characterized by comprising:

recording/reproducing means capable of recording inputted content data to a recording medium and reproducing content data from the recording medium;

content-status managing means capable of placing under delete-prohibition management one or a plurality of ones of content data equal to or less than the upper limit value of among the content data recorded on the recording medium; and automatic-deletion control means for automatically deleting, concerning the content data recorded on the recording medium, the content data from the recording medium, excepting content data being placed under delete-prohibition management in the content-status managing means;

wherein the upper limit value is set as a capacity value in a predetermined percentage of a capacity of the recording medium, whereby a total capacity of one or a plurality of ones of content data to be p laced under delete-prohibition management is equal to or less than the predetermined percentage of capacity value.

16. A recording/reproducing apparatus according to claim 15, wherein the content-status managing means, in the case an operation input instructing delete-prohibition is made for certain content data of among the content data recorded on the recording medium, prohibits the relevant content data from being deleted thereby determining whether to exceed the upper limit value wherein, in a case determined not to exceed the upper limit value, the relevant content data is placed under delete-prohibition management.

17. A recording managing method characterized by comprising:

a managing procedure of placing under delete-prohibition management one or a plurality of ones of content data equal to or less than the upper limit value of among the content data recorded on the recording medium; and automatic deleting procedure, concerning the content data recorded on the recording medium, of automatically deleting content data from the recording medium except for the content data being placed under delete-prohibition management;

wherein the upper limit value is set as a capacity value in a predetermined percentage of a capacity of the recording medium, whereby a total capacity of one or a plurality of ones of content data to be placed under delete-prohibition management is equal to or less than the predetermined percentage of capacity value.

18. A recording medium recording a computer-readable program, the program being for a recording/reproducing apparatus and characterized by including:

a managing step of placing one or a plurality of ones of content data equal to or less than the upper limit value of among the content data recorded on the recording medium under delete-prohibition management; and automatic deleting step, concerning the content data recorded on the recording medium, for automatically deleting content data from the recording medium except for the content data being placed under delete-prohibition management;

wherein the upper limit value is set as a capacity value in a predetermined percentage of a capacity of the recording medium, whereby a total capacity of one or a plurality of ones of content data to be placed under delete-prohibition management is equal to or less than the predetermined percentage of capacity value.

19. A program for a computer recorded in a computer readable medium for controlling a recording/reproducing apparatus to execute:

a managing step of placing one or a plurality of ones of content data equal to or less than the upper limit value of among the content data recorded on the recording medium under delete-prohibition management; and automatic deleting step, concerning the content data recorded on the recording medium, for automatically deleting content data from the recording medium except for the content data being placed under delete-prohibition management;

wherein the upper limit value is set as a capacity value in a predetermined percentage of a capacity of the recording medium, whereby a total capacity of one or a plurality of ones of dontent data to be placed under delete-prohibition management is equal to or less than the predetermined percentage of capacity value.

* * * * *

UNITED STATES PATENT AND TRADEMARK OFFICE
CERTIFICATE OF CORRECTION

PATENT NO. : 7,325,094 B2
APPLICATION NO. : 10/493190
DATED : January 29, 2008
INVENTOR(S) : Murahashi et al.

It is certified that error appears in the above-identified patent and that said Letters Patent is hereby corrected as shown below:

Title Pg, Item (57) Abstract, last line, delete "or so";

Column 1, line 15, "appliances in" should read --appliances of--;

Column 1, line 40 "makes difficult" should read --makes it difficult--;

Column 1, line 41, "there" should read --it--;

Column 1, line 45, delete "some time" should read --some times--;

Column 2, line 22, delete "are";

Column 2, line 34, delete "in";

Column 2, line 40, "to causing" should read --of causing--;

Column 2, line 57, "prevent great" should read --prevent a great--;

Column 3, line 29, delete "determined";

Column 3, line 56, delete "to be";

Column 4, line 43, "prohibition is" should read --prohibition, is--;

Column 5, line 31, delete "to";

Column 5, line 34, delete "or so";

Column 5, line 54, "of a delete" should read --of delete--;

Column 6, line 38, "that the" should read --to which the--;

Column 8, line 18, "soon" should read --so on--;

Column 8, line 67, delete "of";

Column 11, line 9, "as the" should read --of the--;

UNITED STATES PATENT AND TRADEMARK OFFICE
CERTIFICATE OF CORRECTION

PATENT NO. : 7,325,094 B2
APPLICATION NO. : 10/493190
DATED : January 29, 2008
INVENTOR(S) : Murahashi et al.

It is certified that error appears in the above-identified patent and that said Letters Patent is hereby corrected as shown below:

Column 11, line 22, "as the" should read --of the--;

Column 11, line 33, "function" should read --functions--;

Column 11, line 34, "is realized" should read --are realized--;

Column 12, line 1, "content, the" should read --content (the--;

Column 12, line 2, "mark," should read --mark)--;

Column 17, line 26, "are" should read --is--;

Column 18, line 27, "these" should read --this--;

Column 19, line 1, "the user, if desires" should read --if the user desires--;

Column 19, line 2, "deletion," should read --deletion, he or she--;

Column 20, line 17, delete "of";

Column 20, line 18, "a fact" should read --that--;

Column 21, line 45, "p laced" should read --placed--;

Column 22, line 52, "dontent" should read --content--.

Signed and Sealed this

Twenty-fourth Day of February, 2009

JOHN DOLL
*Acting Director of the United States Patent and Trademark Office*